US010162410B1

(12) United States Patent
Koenck et al.

(10) Patent No.: US 10,162,410 B1
(45) Date of Patent: Dec. 25, 2018

(54) HEAD TRACKER FOR DISMOUNTED USERS

(71) Applicant: Rockwell Collins, Inc., Cedar Rapids, IA (US)

(72) Inventors: Steven E. Koenck, Cedar Rapids, IA (US); Brad A. Walker, Mount Vernon, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/117,496

(22) Filed: Aug. 30, 2018

Related U.S. Application Data

(63) Continuation of application No. 15/415,646, filed on Jan. 25, 2017, now Pat. No. 10,067,560.

(51) Int. Cl.
| | |
|---|---|
| *G06F 3/00* | (2006.01) |
| *G06F 3/01* | (2006.01) |
| *G01S 19/13* | (2010.01) |
| *G02B 27/00* | (2006.01) |
| *G02B 27/01* | (2006.01) |

(52) U.S. Cl.
CPC ............. *G06F 3/012* (2013.01); *G01S 19/13* (2013.01); *G02B 27/0093* (2013.01); *G02B 27/017* (2013.01); *G02B 2027/0198* (2013.01)

(58) Field of Classification Search
CPC .............. G02B 27/0093; G02B 27/017; G02B 2027/0198; G06F 3/012; G01S 19/13
See application file for complete search history.

(56) References Cited

U.S. PATENT DOCUMENTS

| | | |
|---|---|---|
| 8,725,400 B1 | 5/2014 | Anderson |
| 9,874,931 B1 | 1/2018 | Koenck et al. |
| 9,883,348 B1 | 1/2018 | Walker et al. |
| 9,891,705 B1 | 2/2018 | Lahr et al. |
| 2017/0263006 A1 | 9/2017 | Hunt et al. |

*Primary Examiner* — Muhammad N Edun
(74) *Attorney, Agent, or Firm* — Angel N. Gerdzhikov; Donna P. Suchy; Daniel M. Barbieri

(57) ABSTRACT

A head-tracking system for dismounted users comprises an inertial georeferenced head tracker (IGHT) having a time-cumulative drift error, an azimuth-referenced head-tracker (ARHT), and a controller. The ARHT comprises a data link with an angle of arrival antenna, differential global position satellite receivers, and a processor configured to determine the head position of the user and initialize the IGHT. The controller may compare a current drift error of the IGHT with a predetermined drift error threshold. If the current drift error is below the predetermined drift error threshold, the IGHT data may accurately represent the head position of the user. If the current drift error is above the predetermined drift error threshold, the IGHT may be updated with the ARHT data to accurately represent the head position of the user.

19 Claims, 11 Drawing Sheets

HEAD TRACKER FOR DISMOUNTED USERS

CROSS-REFERENCE TO RELATED APPLICATIONS

For purposes of the USPTO extra-statutory requirements, the present application constitutes a continuation of the United States patent application entitled HEAD TRACKER FOR DISMOUNTED USERS, naming Steven E. Koenck and Brad A. Walker as inventors, filed Jan. 25, 2017, application Ser. No. 15/415,646, which application is currently co-pending.

This application relates to the following applications filed on even date herewith and each incorporated herein by these references in their entirety: MICRO-BASELINE GPS ANGULAR DETERMINATION by David A. Anderson, having U.S. patent application Ser. No. 12/220,382, issued as U.S. Pat. No. 8,725,400; HEAD TRACKING SYSTEM AND METHOD by Steven E. Koenck and Bobby D. Foote, having U.S. patent application Ser. No. 15/050,208, issued as U.S. Pat. No. 9,874,931; and INDOOR NAVIGATION AND ORIENTATION DETERMINATION SYSTEM by Brad A. Walker, Steven A. Koenck, and Gary A. McGraw, having U.S. patent application Ser. No. 15/415,671, issued as U.S. Pat. No. 9,883,348.

BACKGROUND

Embodiments of the inventive concepts disclosed herein are generally directed to head-tracking systems and methods for providing head position and/or orientation data for dismounted users.

Head-worn displays (HWDs) with head-tracking systems may be used in a variety of applications to provide situational awareness information to users. One type of situation awareness application is known as augmented reality, where a head-worn display system may enable a user to see computer generated information superimposed over a real world view. Timely and accurate alignment of the computer generated information with the real world view is required for augmented reality to be effective. Georeferenced head-tracking determines the position and orientation of the head relative to the Earth, which may enable display of symbology and imagery superimposed over the view of the scene. The potential improvement in situation awareness that may be provided by an augmented reality system is dependent on the accuracy and responsiveness of the head-tracking subsystem.

The accuracy, update rate, latency and jitter requirements for head-tracking systems are challenging. Some existing solutions rely on various combinations of magnetic, optical and inertial tracker subsystems to attempt to meet these requirements. Many of these solutions are only usable in vehicle environments such as the flight deck of an aircraft, and have been large and costly. Applications of augmented reality for dismounted users have been limited by the lack of availability of a sufficiently accurate, fast, jitter-free head tracker. In spite of years of investment and effort, the performance of existing head-tracking systems is still in need of improvement.

SUMMARY

In one aspect, the inventive concepts disclosed herein are directed to a head-tracking system for dismounted users. The head-tracking system includes an inertial georeferenced head tracker (IGHT) configured to be associated with a head of a user and to provide georeferenced head position data indicative of the head position of the user. The IGHT may sense head movement and rotation in all directions, and may report the head position with low latency and high update rates.

In a further aspect, the IGHT may use accelerometers and rate gyros to sense the rate and acceleration of the movement of the head of the user, including sensing the downward directional force of gravity acting on the assembly. Sensing the −1 g. gravity vector may provide an accurate reference for sensing head rotation in the pitch (tipping up/down) and roll (tipping left/right) axes. Accurate measurement of the azimuth (scanning left/right) rotational axis may be performed by an azimuth-referenced head-tracker (ARHT) configured to be associated with the head of the user and to provide azimuth-referenced head position data indicative of the head position of the user. The IGHT may have a current drift error. A controller may be coupled with the IGHT and the ARHT, and may be configured to update the IGHT with corrections to provide accurate georeferenced head position data. The controller may include a processor coupled with a non-transitory processor-readable medium storing processor-executable code.

In a further aspect, the inventive concepts disclosed herein are directed to a motion detecting assembly for a head-tracking system. The motion detecting assembly may include inertial sensors, processing and interfaces to indicate the presence and direction of motion of the user's head. The rate and acceleration of the movement of the head may be sensed and used to predict the future position of the head.

In a further aspect, the inventive concepts disclosed herein are directed to a dismounted head-tracking system using global positioning satellite (GPS) location sensing and a radio frequency communication link to accurately measure the azimuth orientation of the head. The head tracking system may use an azimuth measurement assembly along with one or more gravitational vector detecting assemblies associated with the head of the user to provide head position data indicative of the head position of the user.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
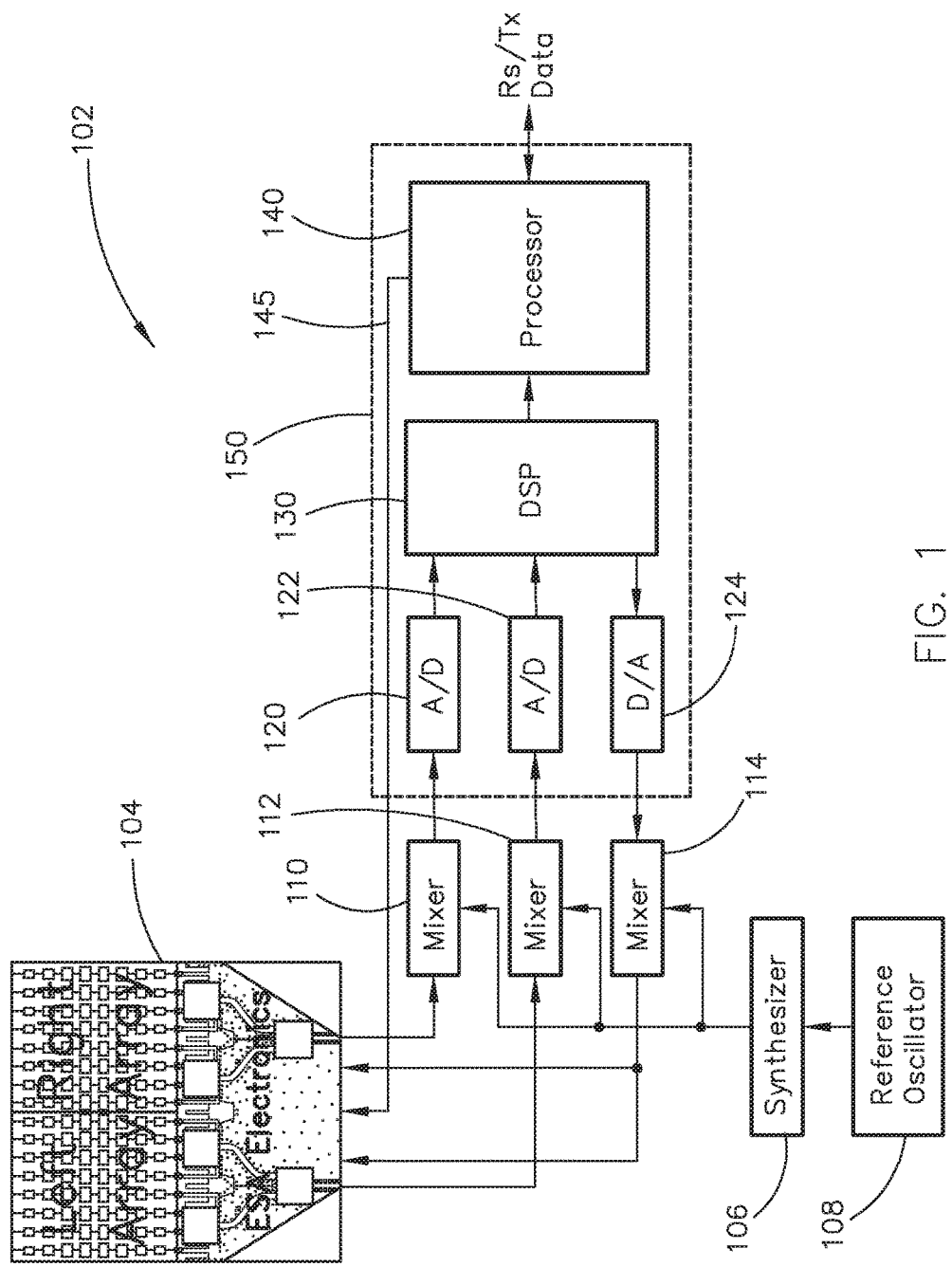
FIG. 1 is a block diagram of an exemplary embodiment of a multi-function data link.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to head tracking for head-worn displays for dismounted users.

Referring now to FIG. 1, a block diagram of an embodiment of a multi-function data link transceiver 102 according to the inventive concepts disclosed herein is shown. The transceiver 102 includes an antenna 104, mixers 110, 112 and 114, a frequency synthesizer 106, a reference oscillator 108, analog to digital (A/D) converters 120 and 122, a digital to analog converter (D/A) 124, a digital signal processor (DSP) 130, and a processor 140. In some embodiments, the transceiver may be configured to operate in millimeter-wave frequency bands such as 35-39 GHz, 45-49 GHz, or 57-66 GHz.

Communication in millimeter-wave frequency bands may require high gain directional antennas to achieve sufficient communication range. In some embodiments, an electrically steerable antenna (ESA) including a plurality of receiving and transmitting elements configured to operate in phased relationship with one another may provide antenna gain in a predetermined spatial direction. The antenna pattern or beam may be directed in a single direction such as horizontal or vertical, or the pattern or beam may be directed in both the horizontal and vertical directions. The ESA may include radio frequency receive and transmit electronic components implemented as radio frequency integrated circuits (RFICs). One or more RFICs may be operatively coupled to each ESA receiving and transmitting element, and may be configured to control the time or phase relationship of the signals received and transmitted by each ESA element. The values of the time or phase to be controlled for each ESA element may be computed by the processor 140, or they may be computed in advance and/or may be stored in an on-board code book memory and retrieved as needed to configure the time or phase controls for each element of the antenna 104 to steer the directional antenna pattern in a desired direction. The steering behavior of the antenna 104 may be controlled by a digital interface 145 from the processor 140 to a digital control input of the antenna 104. In some embodiments, a Serial Peripheral Interface (SPI) standard interface may be used for digital communication between the processor 140 and the antenna steering components of the antenna 104.

In some embodiments, the antenna 104 may be configured to provide beam steering in the horizontal direction, and may be configured with two halves or portions with an independent receive channel operatively coupled to each half or portion. A right half or portion of the antenna 104 may be operatively coupled with the mixer 110, and a left half or portion of the antenna 104 may be operatively coupled with the mixer 112. It is to be understood that the designations left and right are used for reference only, and the antenna 104 may be divided in two or more portions that may be spatially oriented relatively to one another in any desired manner. The mixers 110 and 112 may be driven by a single frequency synthesizer 106, which may generate a tuning frequency from the reference oscillator 108. The mixers 110 and 112 convert the RF signals to baseband signals that may be operatively coupled to the A/D converters 120 and 122. The outputs of the A/D converters 120 and 122 may be operatively coupled to the DSP 130, which may perform filtering, demodulation, and other signal processing operations associated with receiving a data link transmission.

The DSP 130 may simultaneously receive signals from both the left half or portion and the right half or portion of the antenna 104. After filtering and demodulating the two sets of signals, the DSP 130 may compare the relative time of arrival of the left half signal with respect to time of arrival of the right half signal, and may use this information to determine the angle of arrival of the RF signal that originated from a single transmitter.

The multi-function data link transceiver 102 may also transmit information in the same millimeter-wave frequency bands that it uses to receive information. The transmit function may utilize a portion of the DSP 130 for signal processing, modulation and filtering, the D/A converter 124, the up-converting mixer 114, and the transmit portion of the ESA 104. Selection of the ESA steering angle may be performed similarly to the receive function by either onboard computation or precomputation and storage in code book memory.

Figure 2:
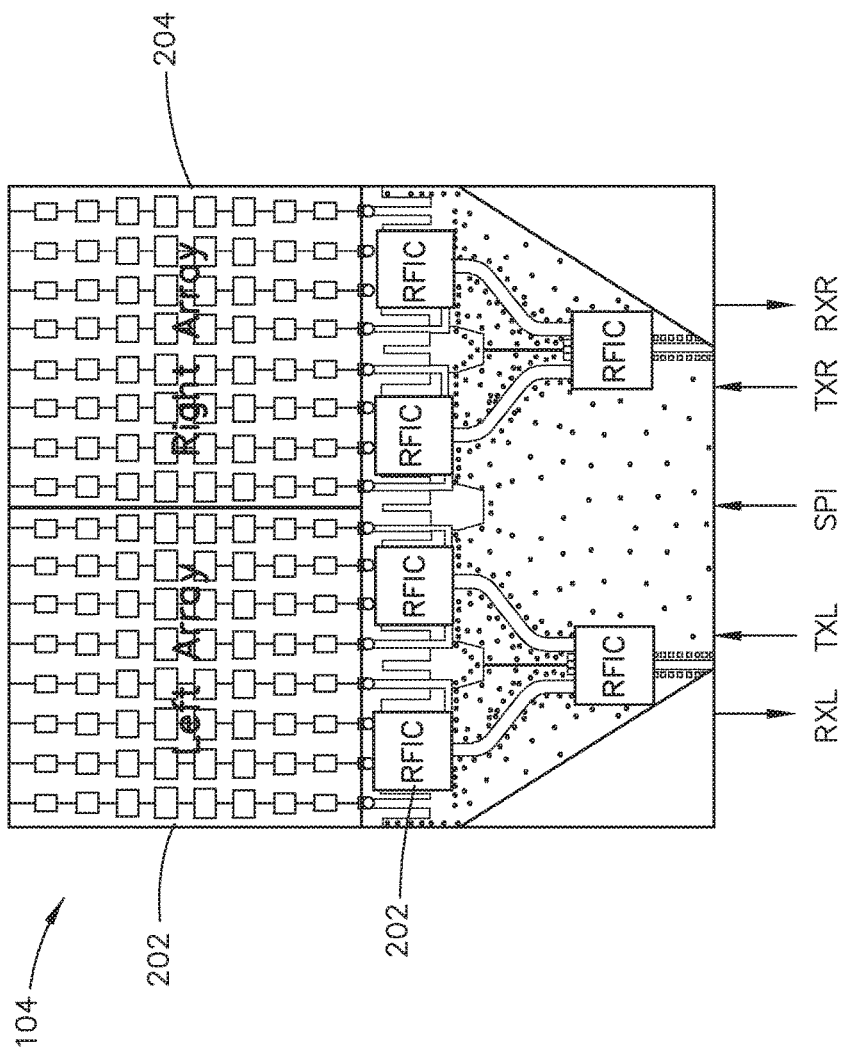
FIG. 2 is a diagram of the antenna assembly of FIG. 1 associated with a multi-function data link according to the inventive concepts disclosed herein.

Referring now to FIG. 2, the antenna 104 may include one or more RFICs mounted on a printed circuit board with patterned conductors to form the antenna elements. The RFICs 202 may include RF receive, transmit and time delay or phase control functions. The RFICs 202 also may include a digital interface such as an SPI bus connection to the processor 140 of FIG. 1 for setting control parameters including the signal time delay or phase control for each element in the ESA. In some embodiments, the antenna 104 may be divided into two halves or portions with independent receive paths and common or independent transmit paths. The independent receive paths may each be operatively coupled to receiver signal processing circuits as shown and described in FIG. 1. The separate receive channels may be used to determine the angle of arrival of the received RF transmission by measuring the time difference between the signals received on each channel.

Figure 3:
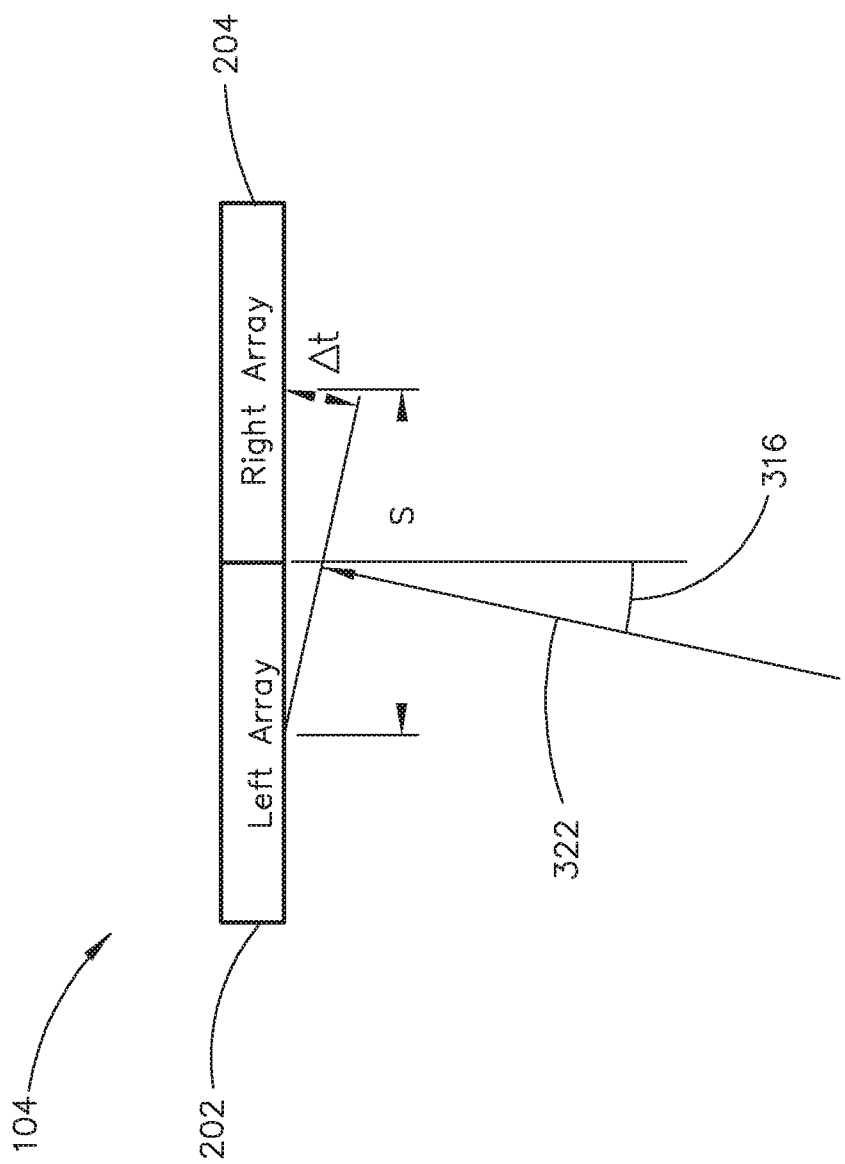
FIG. 3 is a diagram of an exemplary embodiment of an antenna assembly configured to determine the angle-of-arrival of a received radio frequency signal according to the inventive concepts disclosed herein.

Referring now to FIG. 3, the angle of arrival measurement provided by the two halves of the antenna 104 is illustrated. An RF transmission 322 may be received by each half or portion of the antenna 104. In the example of FIG. 3, the left array half (or portion) 202 may receive the RF signal before the right array half (or portion) 204 by an amount of time Δt. Since the RF signal propagates through space at approximately the speed of light, the difference d in the path lengths between the signal received by the left half array and the signal received by the right half array may be determined by multiplying the measured time Δt by the speed of light c, or $3 \times 10^8$ meters per second. The angle of arrival 316 may be calculated by performing the trigonometric calculation:

Angle of Arrival=arc cos($d/s$)

where s is the physical distance between the phase centers of each of the antenna halves 202 and 204.

The position and orientation of the head of a user is defined by the three translational axes or Cartesian coordinates: x, y, and z, or in georeferenced coordinates: latitude, longitude and elevation; and the three rotational axes: yaw or azimuth, pitch and roll. Determination of the Cartesian coordinates of an object may be accomplished using a GPS receiver or the like. Accurate determination of the pitch and roll rotational position of an object such as the head of a dismounted user may be accomplished by using accelerometer sensors to measure the −1 g. gravitational force acting on the object. Accurate determination of the yaw or azimuth rotational position of an object such as the head of a dismounted user is more difficult and requires a more complex solution that will now be described.

Figure 4:
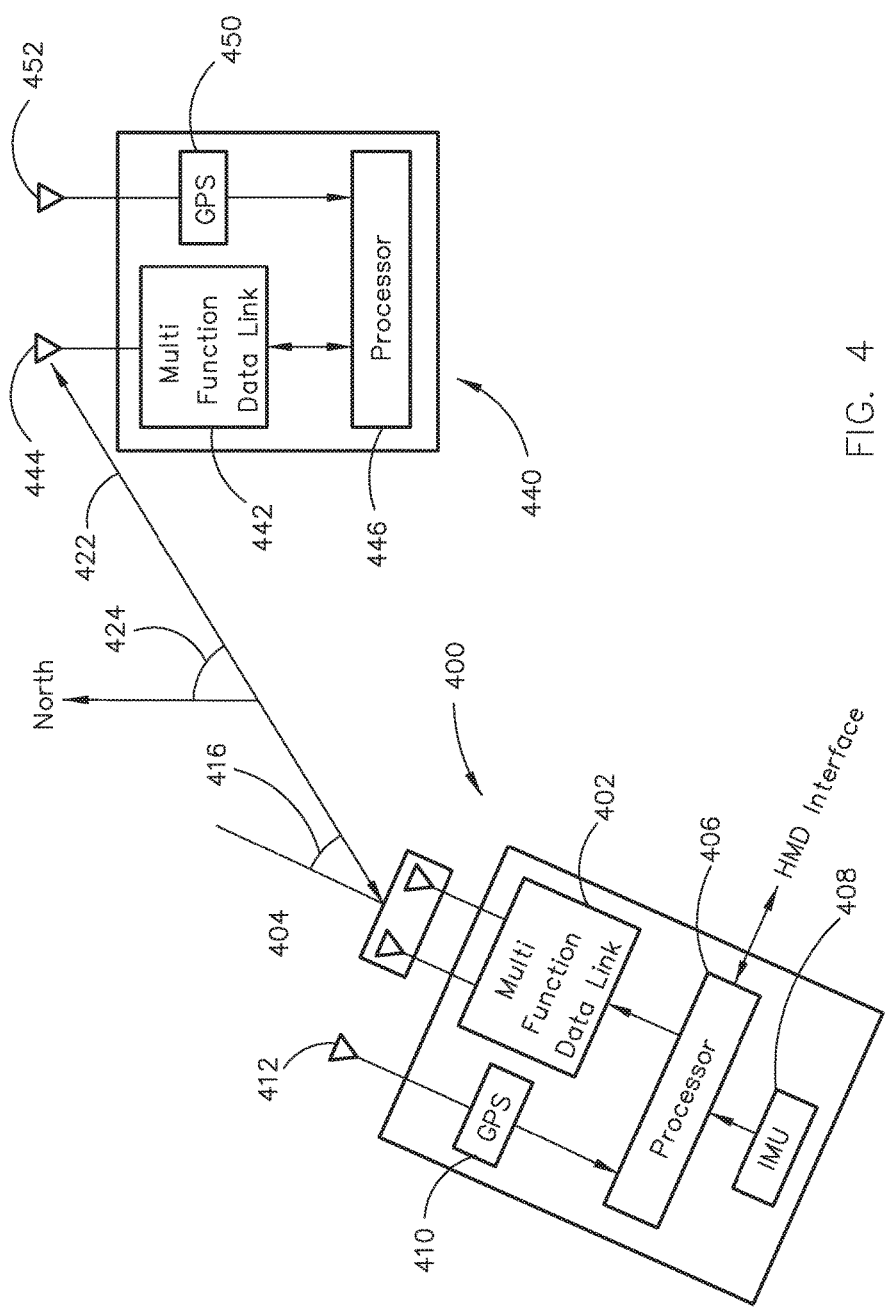
FIG. 4 is a block diagram of an exemplary embodiment of an azimuth-referenced head tracker according to the inventive concepts disclosed herein.

Referring now to FIG. 4, an embodiment of a system for head tracking for dismounted users according to the inventive concepts disclosed herein may include a head tracker assembly 400 associated with the head of a user, and an azimuth baseline transmitter 440. The head tracker assembly 400 may include a global positioning system (GPS) receiver 410 with an antenna 412, a multi-function data link transceiver 402 with a dual antenna 404, an inertial measurement unit (IMU) 408, and a processor 406. An azimuth baseline transmitter 400 may include a GPS receiver 450 with an antenna 452, a multi-function data link transceiver 442 with a single antenna 444, and a processor 446.

Still referring to FIG. 4, the azimuth baseline transmitter 440 may communicate with the head tracker assembly 400 using a data transmission capability of the multi-function data link transceivers 444 and 402 with a line-of-sight radio frequency transmission path 422 between the transceivers 444 and 402. A portion of the data transmitted between the azimuth baseline transmitter 440 and the head tracker assembly 400 may include differential GPS information that may be used by both transceivers 444 and 402 to reduce location error artifacts that are common to both transceivers 444 and 402. The reduction of the common location error artifacts may enable more accurate determination of the positions of the azimuth baseline transmitter 440 and the head tracker assembly 400 with respect to each other, which may enable accurate determination of the bearing angle 424 from the head tracker assembly 400 and the azimuth baseline transmitter 440 with respect to earth referenced true north.

Still referring to FIG. 4, the multi-function data link 402 may be equipped with a dual antenna 404 operatively coupled with dual receivers. By comparing the relative times of the arrival of a single radio frequency transmission 420 on each of the dual receivers, the angle of arrival 416 of the transmission from the remote transceiver may be determined. The angle of arrival measurement 416 may be subtracted from the bearing angle from the head tracker assembly 400 to the azimuth baseline transmitter 440 to determine the heading of the head tracker 400 with respect to true north.

Still referring to FIG. 4, in some embodiments the IMU 408 may be configured to provide the primary head tracking or head orientation information for a head-worn display. The IMU 408 is inherently georeferenced (an inertial georeferenced head tracker, or IGHT), so that movement and acceleration of the IMU 408 in any of the translational or rotational directions may be sensed and electronically communicated with low latency and high update rates. The IMU 408 may be initialized with initial position and orientation information, and is subject to drift over time. Once the IMU 408 is initialized, the IMU 408 may maintain a reasonably accurate measure of position and orientation for an amount of time based on the drift characteristics of the IMU 408. In an embodiment according to the inventive concepts disclosed herein, the IMU 408 may be updated periodically by an angle of arrival measurement assembly and an azimuth baseline transmitter assembly configured together to implement an azimuth referenced head tracker (ARHT) that may provide accurate azimuth update information to the IMU 408. Since the ARHT relies on an RF data link for operation, there may be times when the data link is not available due to, for example, momentary obstruction of the line of sight between the head tracker 400 and the azimuth baseline transmitter 440. The IGHT is available to provide data indicative of the head position of the user so long as the time between updates from the AHRT does not exceed the IGHT drift accumulation threshold.

Figure 5:
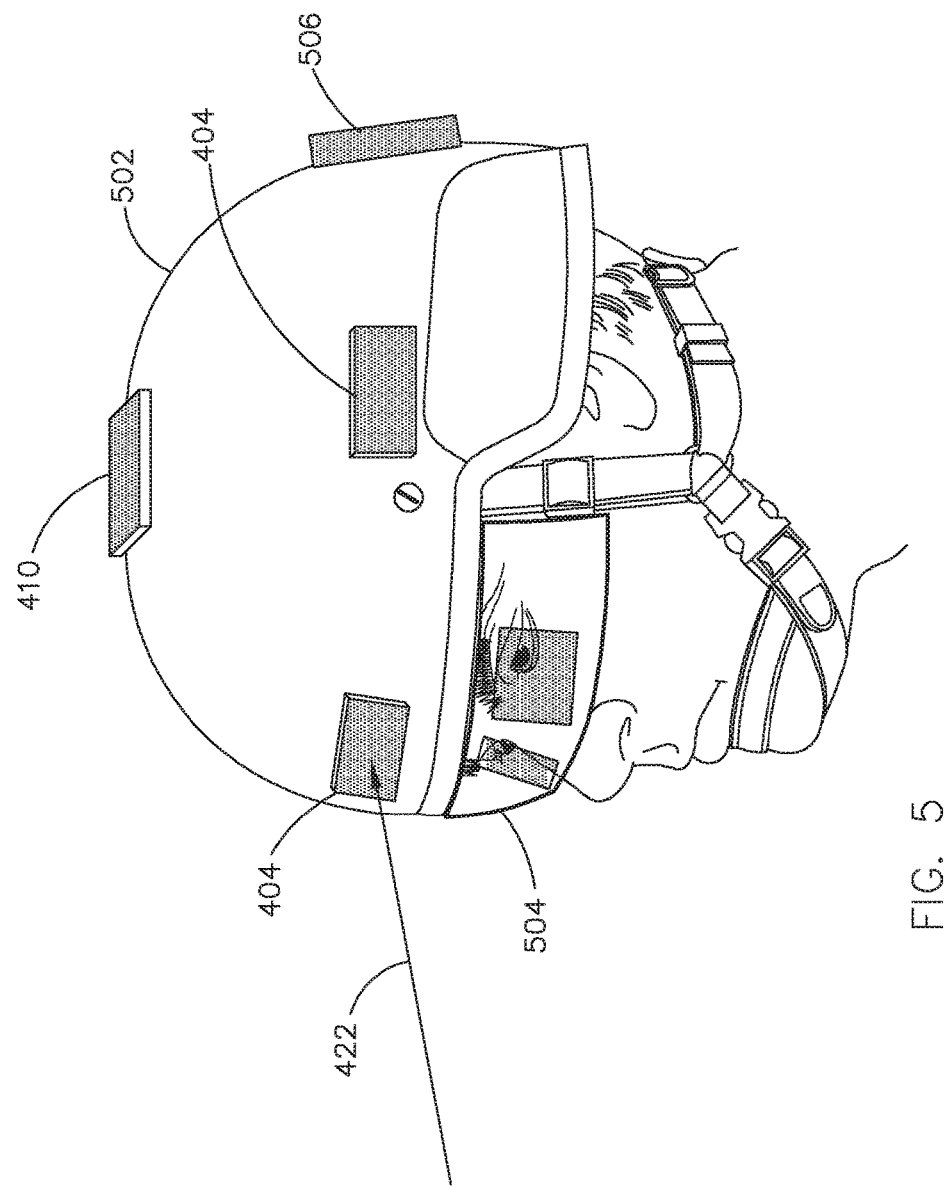
FIG. 5 is a diagram of an exemplary embodiment of a head-worn display with a head tracker according to the inventive concepts disclosed herein.

Referring now to FIG. 5, an exemplary embodiment of a head-worn display assembly with a head tracking system according to the inventive concepts disclosed herein is illustrated. An individual dismounted user may wear a helmet 502 for head protection as the user conducts various tasks. A see-through head-worn display assembly 504 may be configured to be mounted on the helmet 502 and placed in front of the user's eyes so that information may be presented on the display assembly 504 that is effectively superimposed over the scenes viewed by the user through the display assembly 504. One or more dual antennas 404 may be configured on or around the helmet 502 to receive a line of sight RF transmission 422 and to determine the angle of arrival of the remote transmitter. A GPS receiver 410 configured on the helmet 502 determines the user's geophysical location. Differential GPS information from the azimuth baseline transmitter to the head tracker assembly may be used by both receivers to provide an accurate azimuth baseline between the azimuth baseline transmitter and the helmet 502. A processor 506 may be configured to be mounted on the helmet 502, and may provide computing resources to place information at selected locations in the display assembly 504. In some embodiments, the display information may be related to objects, areas or regions of the scene that the processor 506 may be configured to bring to the user's attention by creating graphical or other computer generated symbology that is accurately aligned with the scene viewed by the user. In some embodiments, all of the components associated with the operation of the head-worn display and head tracker such as the dual antennas 404, the GPS receiver 410 and the processor 506 may be packaged in a single enclosure. The single enclosure may be placed at the top of the helmet 502 to enable reception of RF signals from above and around the user.

Figure 6:
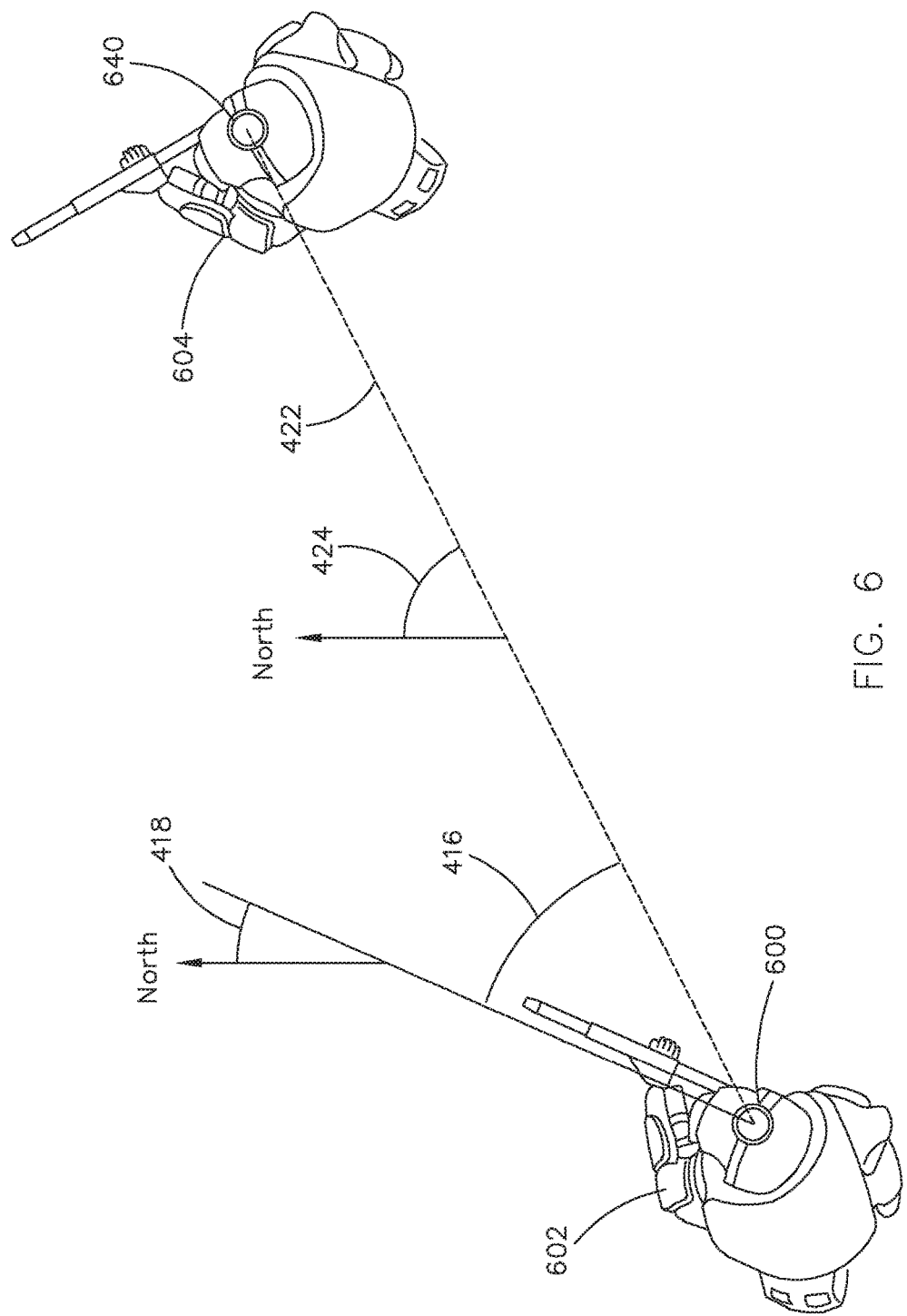
FIG. 6 is a diagram showing a dismounted user of the head-worn display with a head tracker where an azimuth baseline transmitter is associated with a second user.

Referring now to FIG. 6, an exemplary embodiment of a head-worn display system with dismounted head tracking according to the inventive concepts disclosed herein is shown. A first user 602 may be dismounted, and may be wearing a head-worn display system with a head tracker 600. A second user 604 may also be dismounted, and may be wearing a head-worn display system with a head tracker identical to 600, or the second user 604 may be wearing only an azimuth baseline transmitter 640 without a head-worn display, which would serve to provide azimuth baseline information to the head tracker 600, but would provide no head tracking information to the user 604. The azimuth baseline transmitter may transmit to the head tracker 600 over the RF data link path 422, which may provide an azimuth measurement 424 between the two users 602 and 604. The angle of arrival assembly in the head tracker 600 may measure the angle of arrival 416 of the RF data link transmission 422 from the azimuth baseline transmitter 640. The azimuth value 418 used to update the IMU 408 in the head tracker may be computed based on the angle of arrival measurement from the azimuth baseline measurement at a known instant in time determined by the latency in the azimuth information acquisition and calculation in some embodiments.

Figure 7:
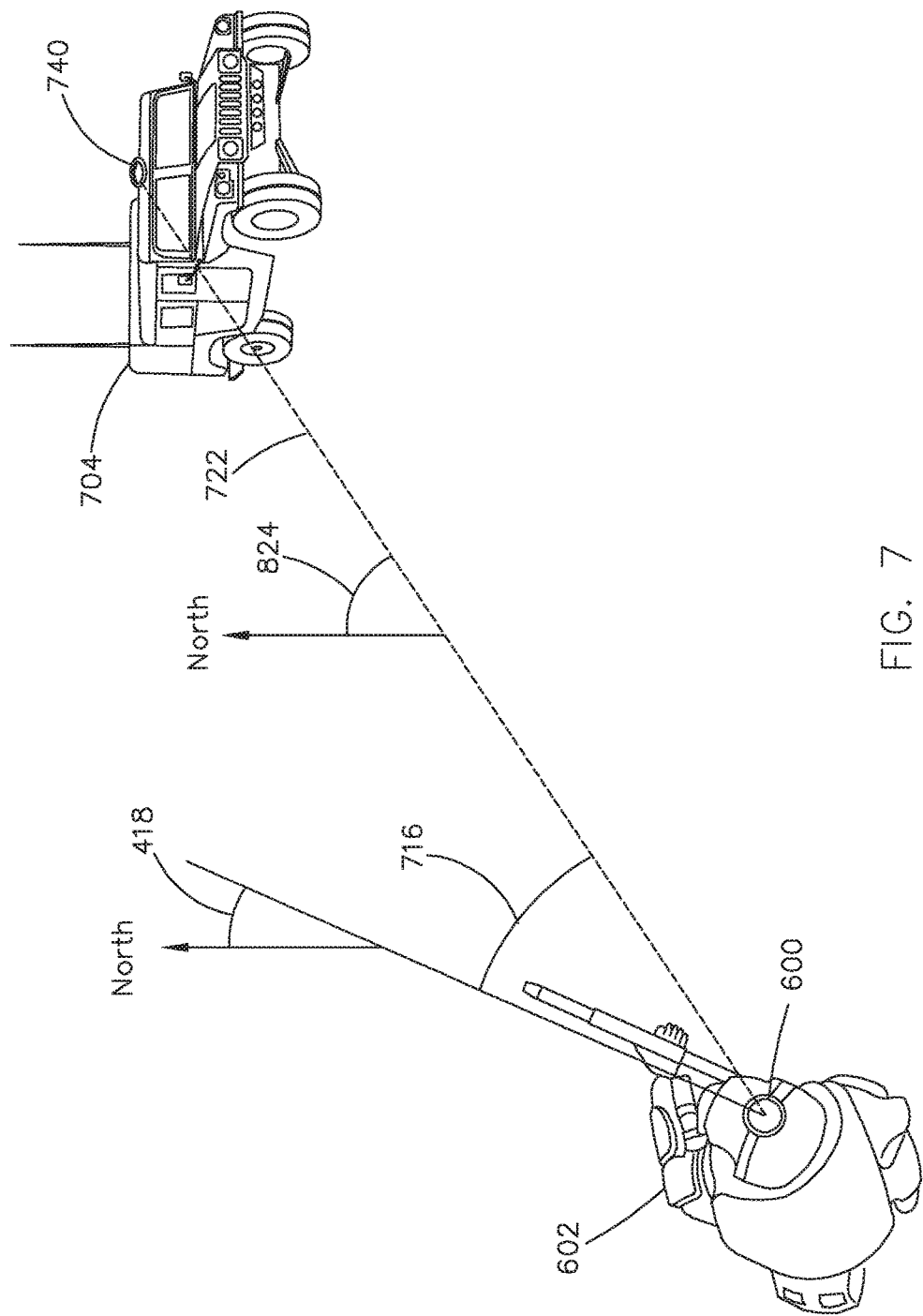
FIG. 7 is a diagram showing a dismounted user of a head-worn display with a head tracker where an azimuth baseline transmitter is associated with a ground vehicle.

Referring now to FIG. 7, an exemplary embodiment of a head-worn display system with dismounted head tracking and a supporting ground vehicle transmitter according to the inventive concepts disclosed herein is shown. The user 602 may be dismounted, and may be wearing a head-worn display system with a head tracker 600. A ground vehicle 704 located within a communication range of the data link may be configured with an azimuth baseline transmitter 740. The azimuth baseline transmitter may transmit to the head tracker 600 over the RF data link path 722, which may provide the azimuth measurement 724 between the two assemblies. The angle of arrival assembly in the head tracker 600 may measure the angle of arrival 716 of the RF data link transmission 722 from the azimuth baseline transmitter 740. The azimuth value 418 used to update the IMU 408 in the head tracker may be computed based on the angle of arrival measurement from the azimuth baseline measurement at a known instant in time determined by the latency in the azimuth information acquisition and calculation.

Figure 8:
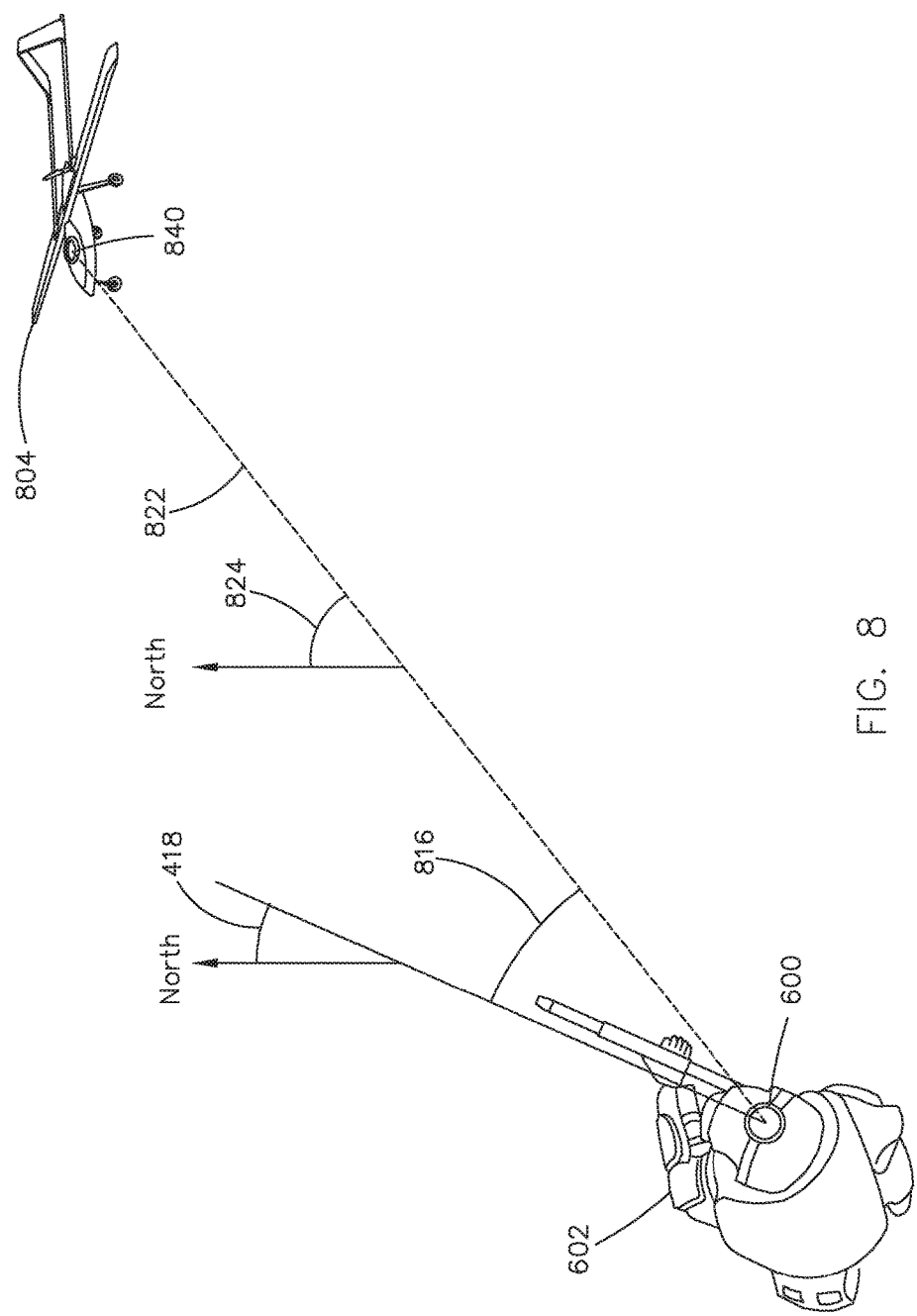
FIG. 8 is a diagram showing a dismounted user of a head-worn display with a head tracker where an azimuth baseline transmitter is associated with an aircraft.

Referring now to FIG. 8, an exemplary embodiment of a head-worn display system with dismounted head tracking and a supporting airborne transmitter according to the inventive concepts disclosed herein is shown. The user 602 may be dismounted, and may be wearing a head-worn display system with a head tracker 600. An airborne vehicle 804 operating within the communication range of the data link may be configured with an azimuth baseline transmitter 840. The azimuth baseline transmitter may transmit to the head tracker 600 over the RF data link path 822, which may provide the azimuth measurement 824 between the two assemblies. The angle of arrival assembly in the head tracker 600 may measure the angle of arrival 816 of the RF data link transmission 822 from the azimuth baseline transmitter 840. The azimuth value 418 used to update the IMU 408 in the head tracker may be computed based on the angle of arrival measurement from the azimuth baseline measurement at a known instant in time determined by the latency in the azimuth information acquisition and calculation.

Figure 9:
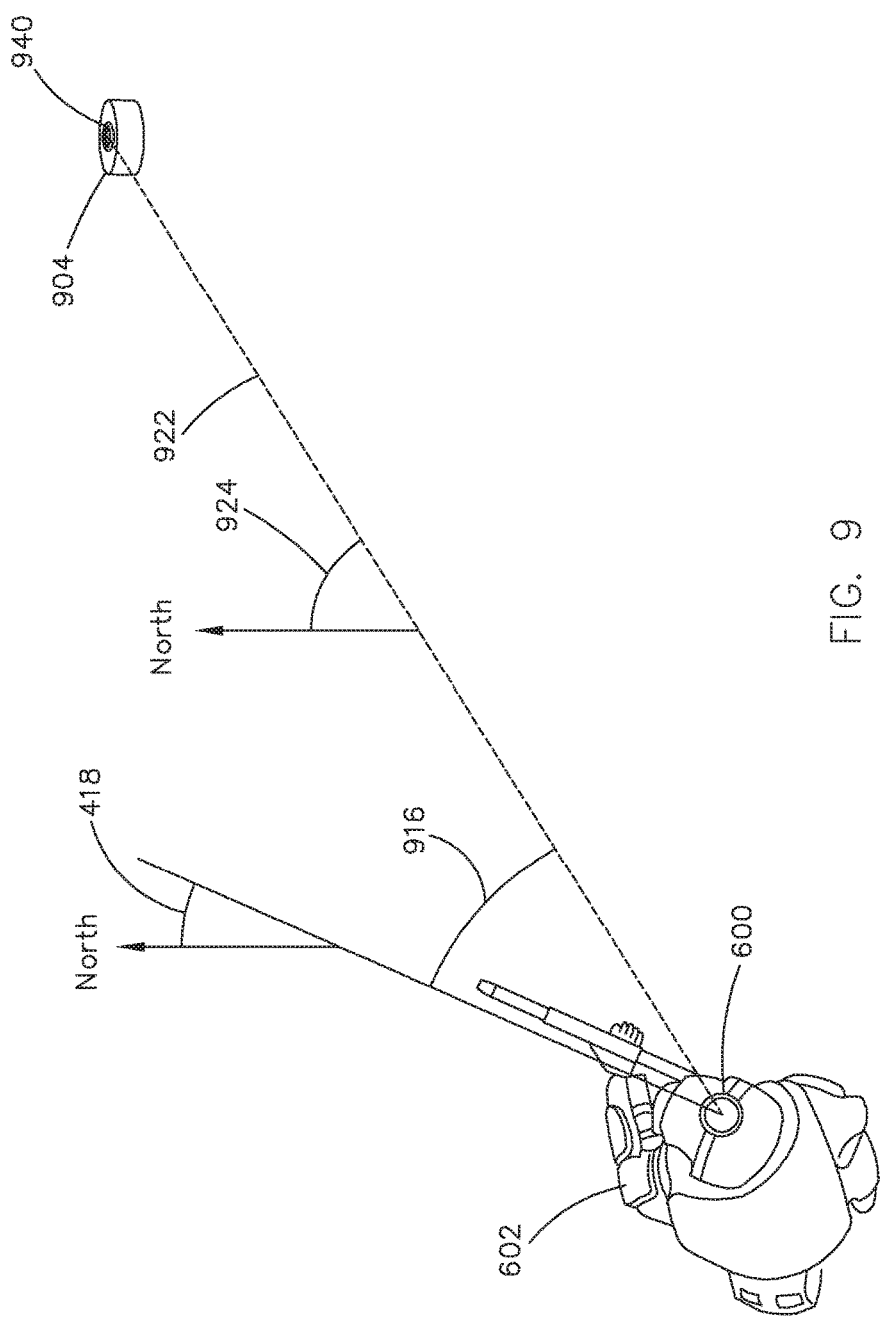
FIG. 9 is a diagram showing a dismounted user of a head-worn display with a head tracker where an azimuth baseline transmitter is an unattended module.

Referring now to FIG. 9, an exemplary embodiment of a head-worn display system with dismounted head tracking and an unattended ground transmitter according to the inventive concepts disclosed herein is shown. The user 602 may be dismounted, and may be wearing a head-worn display system with a head tracker 600. An unattended ground transmitter 904 may be configured with an azimuth baseline transmitter 940, and may be placed on the ground or in some other available location. The azimuth baseline transmitter 940 may transmit to the head tracker 600 over the RF data link path 922, which may provide the azimuth measurement 924 between the two assemblies. The angle of arrival assembly in the head tracker 600 may measure the angle of arrival 916 of the RF data link transmission 922 from the azimuth baseline transmitter 940. The azimuth value 418 used to update the IMU 408 in the head tracker may be computed based on the angle of arrival measurement from the azimuth baseline measurement at a known instant in time determined by the latency in the azimuth information acquisition and calculation.

Figure 10:
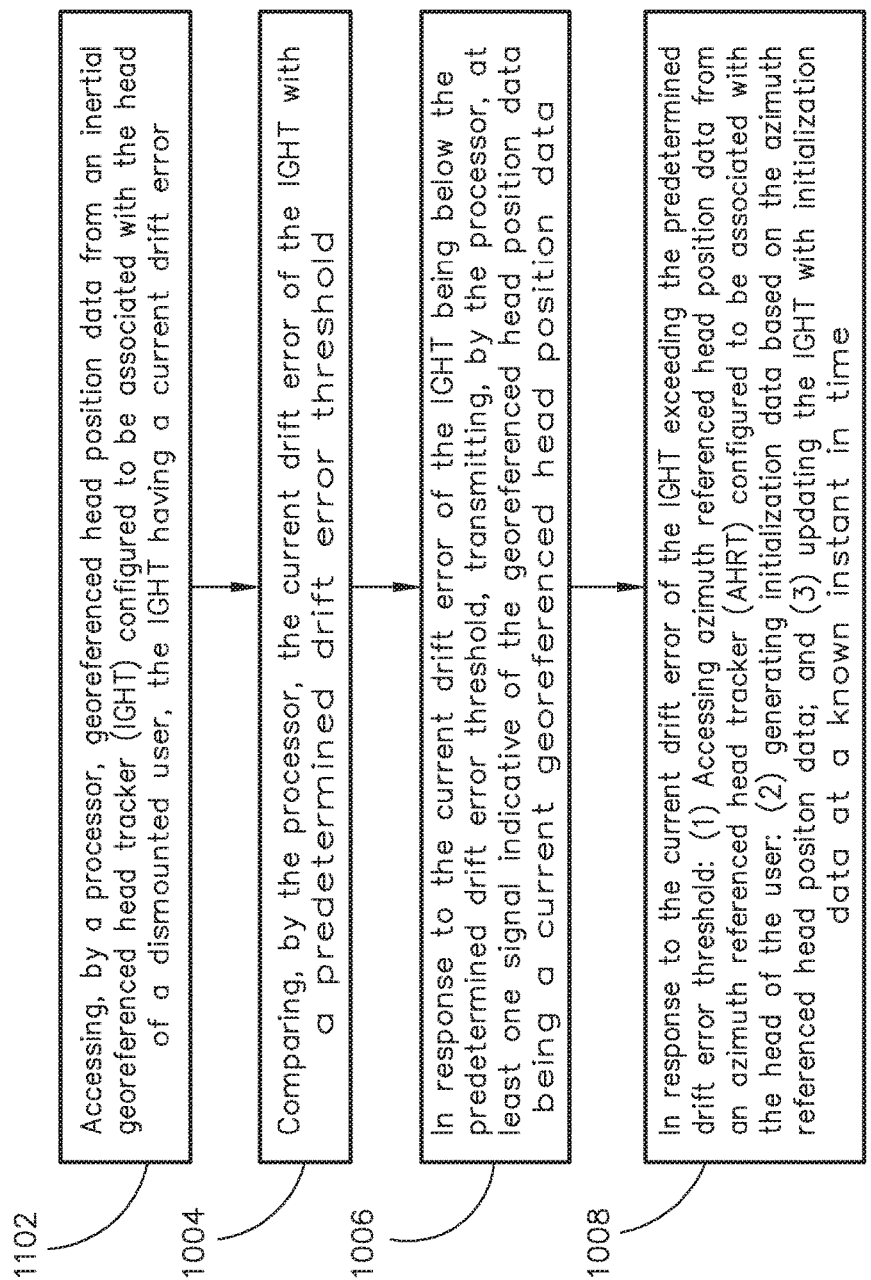
FIG. 10 is a diagram of an exemplary embodiment of a method for providing head tracking for head-worn displays for dismounted users according to the inventive concepts disclosed herein.

Referring now to FIG. 10, an exemplary embodiment of a method according to the inventive concepts disclosed herein may include one or more of the following steps.

In a step 1002 a processor executing processor-executable code stored in a non-transitory processor-readable medium may access georeferenced head position data from an inertial georeferenced head tracker (IGHT) configured to be associated with a head of a dismounted user, the IGHT having a time-cumulative drift error.

In a step 1004, the processor may compare a current drift error of the IGHT with a predetermined drift error threshold. The current drift error of the IGHT may be determined based on the time-cumulative drift error of the IGHT and a period of time elapsed from a last known initialization of the IGHT in some embodiments.

In a step 1006, in response to the current drift error of the IGHT being below the predetermined drift error threshold, the processor may transmit a signal indicative of the georeferenced head position data being a current georeferenced head position data.

In a step 1008, in response to the current drift error of the IGHT exceeding the predetermined error threshold, the processor may access azimuth-referenced head position data from an azimuth-referenced head-tracker (ARHT) configured to be associated with the head of the user, generate initialization data based on the azimuth-referenced head position data, and initialize the IGHT with the initialization data at a known instant in time. In some embodiments, the ARHT may include an angle of arrival measurement of an RF data link communication from an azimuth baseline transmitter to the IGHT, both equipped with GPS receivers, the GPS receivers operating in differential mode, and configured to be associated with the head of the user.

Figure 11:
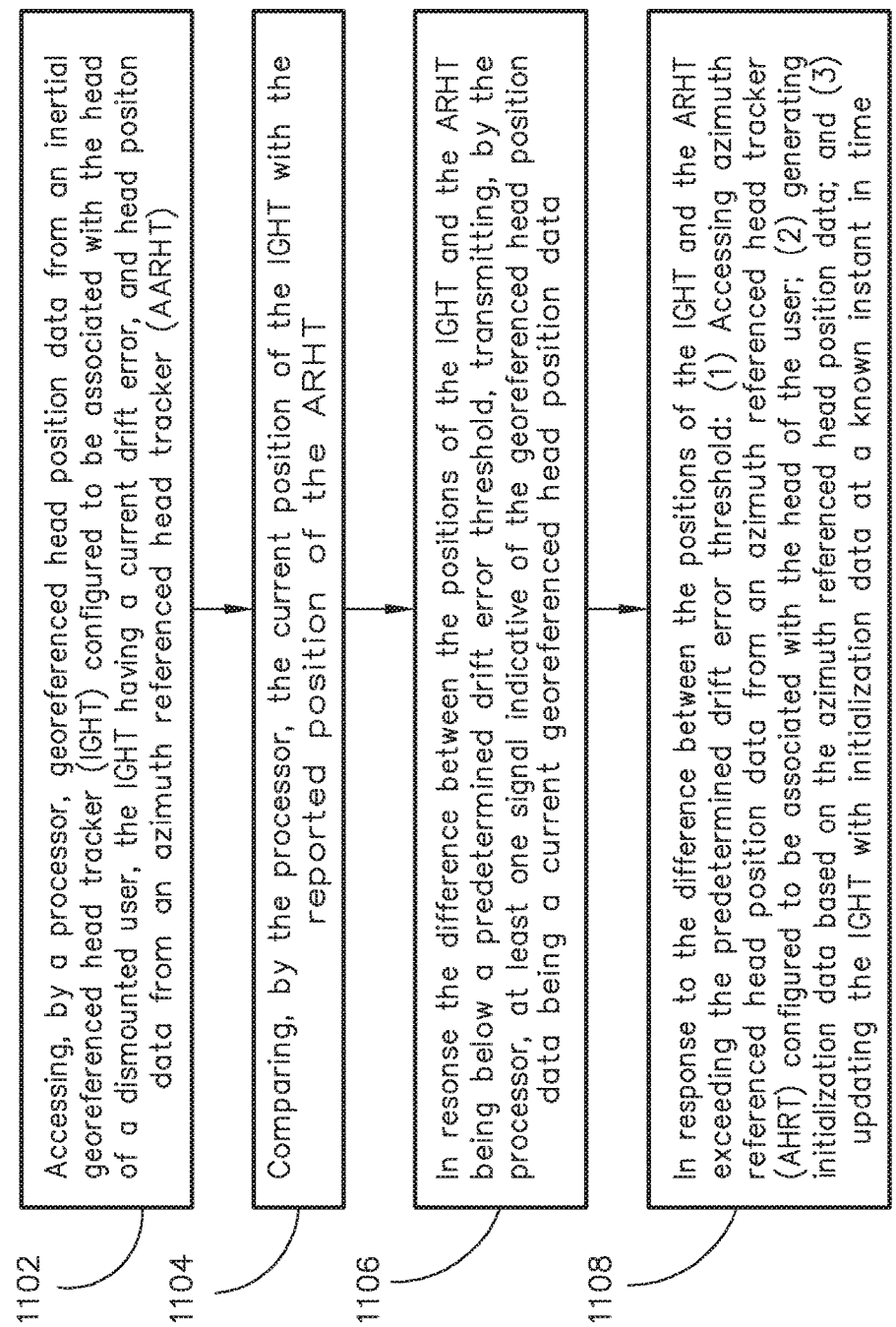
FIG. 11 is a diagram of an exemplary embodiment of a method for providing head tracking for head-worn displays for dismounted users according to the inventive concepts disclosed herein.

Referring now to FIG. 11, an exemplary embodiment of a method according to the inventive concepts disclosed herein may include one or more of the following steps.

In a step 1102 a processor executing processor-executable code stored in a non-transitory processor-readable medium may access georeferenced head position data from an inertial georeferenced head tracker (IGHT) configured to be associated with a head of a dismounted user, the IGHT having a time-cumulative drift error, and head position data from an azimuth referenced head tracker (ARHT).

In a step 1104, the processor may compare the current position of the IGHT with the reported position of the AHRT. In some embodiments, the ARHT may include an angle of arrival measurement of an RF data link communication from an azimuth baseline transmitter to the IGHT, where the azimuth baseline transmitter and the IGHT are both equipped with GPS receivers operating in differential GPS mode.

In a step 1106, in response to the difference between the positions of the IGHT and the AHRT being below the predetermined drift error threshold, the processor may transmit a signal indicative of the georeferenced head position data being a current georeferenced head position data.

In a step 1108, in response to the difference between the positions of the IGHT and the AHRT exceeding the predetermined error threshold, the processor may access azimuth-referenced head position data from an azimuth-referenced head-tracker (ARHT) configured to be associated with the head of the user, generate initialization data based on the azimuth-referenced head position data, and initialize the IGHT with the initialization data at a known instant in time.

As will be appreciated from the above, dismounted head trackers according to embodiments of the inventive concepts disclosed herein may provide an accurate indication of the position of the head of a user with low latency and high update rates, which is essential for many head-worn display applications.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. A head-tracking device capable of being carried by a dismounted user, comprising:
    at least one inertial measurement unit (IMU) configured to be associated with a head of the dismounted user and to provide inertial georeferenced head tracker (IGHT) data indicative of a head pose of the user, the IMU having a time-cumulative drift error;
    a data link transceiver configured to be associated with the head and comprising:
        a GPS receiver;
        an electronically steerable antenna (ESA) array including at least a first ESA element associated with one or more of a first angle and a first direction and a second ESA element associated with one or more of a second angle and a second direction, the first ESA element and the second ESA element configured to receive at least one inbound signal transmitted by a remote transmitter configured to be positioned at a distance from the head;
    and
    at least one processor configured to:
        access the IGHT data;
        compare a current drift error of the IMU with a predetermined drift error threshold;
        in response to the current drift error deceeding the drift error threshold, transmit via the ESA array at least one outbound signal indicative of the IGHT data being a current georeferenced head pose of the user;
        determine an angle of arrival (AoA) of the inbound signal received by the first ESA element and the second ESA element;
        determine, based on the AoA, azimuth-referenced head tracker (ARHT) data indicative of the head pose of the user;
        in response to the current drift error exceeding the drift error threshold, generate initialization data based on the ARHT data and update the IMU with the initialization data;
    and
    transmit, via the ESA array, at least one outbound signal indicative of the updated IGHT data being the current georeferenced head pose of the user.

2. The head-tracking device of claim 1, wherein:
    the IMU is updated with the initialization data at a known time;
    and the processor is configured to determine the current drift error based on an elapsed time from the known time corresponding to the most recent update of the IMU.

3. The head-tracking device of claim 1, wherein the GPS receiver is a first GPS receiver and:
the remote transmitter includes a second GPS receiver; and
the processor is configured to:
access a first georeferenced location of the first GPS receiver and a second georeferenced location of the second GPS receiver;
determine an azimuth baseline between the first GPS receiver and the second GPS receiver; and
determine a georeferenced azimuth of the head-tracking device.

4. The head-tracking device of claim 3, wherein the processor is configured to simultaneously determine the AoA and differential GPS information between the first GPS receiver and the second GPS receiver.

5. The head-tracking device of claim 1, wherein the head pose of the user corresponds to one or more of a position of the head and an orientation of the head.

6. The head-tracking device of claim 1, wherein the dismounted user is a first dismounted user and:
the remote transmitter is associated with one of: a second dismounted user, a ground-based vehicle, an airborne vehicle, a water-based vehicle, and an unmanned ground-based assembly.

7. The head-tracking device of claim 1, wherein the processor is configured to determine one or more of the first angle, the first direction, the second angle, and the second direction.

8. The head-tracking device of claim 1, wherein the processor is configured to determine control parameters corresponding to at least one of the first ESA element and the second ESA element, the control parameters including one or more of a time delay and a phase control.

9. The head-tracking device of claim 1, wherein the first ESA element and the second ESA element include at least one radio frequency integrated circuit (RFIC).

10. The head-tracking device of claim 1, further comprising:
at least one interface configured to transmit the outbound signal to a head-worn display (HWD) worn by the user.

11. A head-tracking device capable of being carried by a dismounted user, comprising:
at least one inertial measurement unit (IMU) configured to be associated with a head of the dismounted user and to provide inertial georeferenced head tracker (IGHT) data indicative of a head pose of the user, the IMU having a time-cumulative drift error;
a data link transceiver configured to be associated with the head and comprising:
a GPS receiver;
an electronically steerable antenna (ESA) array including at least a first ESA element associated with one or more of a first angle and a first direction and a second ESA element associated with one or more of a second angle and a second direction, the first ESA element and the second ESA element configured to receive at least one inbound signal transmitted by a remote transmitter configured to be positioned at a distance from the head;
and
at least one processor configured to:

access the IGHT data;
determine an angle of arrival (AoA) of the inbound signal received by the first ESA element and the second ESA element;
determine, based on the AoA, azimuth-referenced head tracker (ARHT) data indicative of the head pose of the user;
determine a delta by comparing the IGHT data with the determined ARHT data;
in response to the determined delta deceeding a predetermined error threshold, transmit via the ESA array at least one outbound signal indicative of the IGHT data being a current georeferenced head pose of the user;
in response to the determined delta exceeding a predetermined error threshold, 1) generate initialization data based on the determined ARHT data and 2) update the IGHT data with the initialization data at a known time;
and
transmit via the ESA array at least one outbound signal indicative of the updated IGHT data being the current georeferenced head pose of the user.

12. The head-tracking device of claim 11, wherein the GPS receiver is a first GPS receiver and:
the remote transmitter includes a second GPS receiver; and
the processor is configured to:
access a first georeferenced location of the first GPS receiver and a second georeferenced location of the second GPS receiver;
determine an azimuth baseline between the first GPS receiver and the second GPS receiver; and
determine a georeferenced azimuth of the head-tracking device.

13. The head-tracking device of claim 12, wherein the processor is configured to simultaneously determine the AoA and differential GPS information between the first GPS receiver and the second GPS receiver.

14. The head-tracking device of claim 11, wherein the head pose of the user corresponds to one or more of a position of the head and an orientation of the head.

15. The head-tracking device of claim 11, wherein the dismounted user is a first dismounted user and:
the remote transmitter is associated with one of: a second dismounted user, a ground-based vehicle, an airborne vehicle, a water-based vehicle, and an unmanned ground-based assembly.

16. The head-tracking device of claim 11, wherein the processor is configured to determine one or more of the first angle, the first direction, the second angle, and the second direction.

17. The head-tracking device of claim 11, wherein the processor is configured to determine control parameters corresponding to at least one of the first ESA element and the second ESA element, the control parameters including one or more of a time delay and a phase control.

18. The head-tracking device of claim 11, wherein the first ESA element and the second ESA element include at least one radio frequency integrated circuit (RFIC).

19. The head-tracking device of claim 11, further comprising:
at least one interface configured to transmit the outbound signal to a head-worn display (HWD) worn by the user.

* * * * *